Feb. 20, 1940. J. CORYDON ET AL 2,190,933
PROPORTIONING APPARATUS
Original Filed June 7, 1935

Inventors
Jeff Corydon
and Rudy Lowe
BY Ferd Bing
Attorney.

Patented Feb. 20, 1940

2,190,933

UNITED STATES PATENT OFFICE 2,190,933

PROPORTIONING APPARATUS

Jeff Corydon and Rudy Lowe, Providence, R. I., assignors to Proportioners, Inc., Providence, R. I., a corporation of Rhode Island Original application June 7, 1935, Serial No. 25,467. Divided and this application August 10, 1938, Serial No. 224,125

3 Claims. (Cl. 103—38)

Our invention relates generally to proportioning apparatus and more particularly to such apparatus adapted for use in proportionally treating a variable flow of a major liquid.

An important object of the present invention is to provide a new and improved proportioning apparatus for such use.

A further object is to provide a new and improved proportioning apparatus in which a finely graduated proportional relation may be attained between the major liquid and the minor liquid or reagent, and wherein corrective measures may be readily, easily and accurately applied to restore or initially attain the desired proportional relation between the liquids.

Other objects and advantages will become apparent from the following description, taken in connection with the accompanying drawing, in which.

Figure 1:
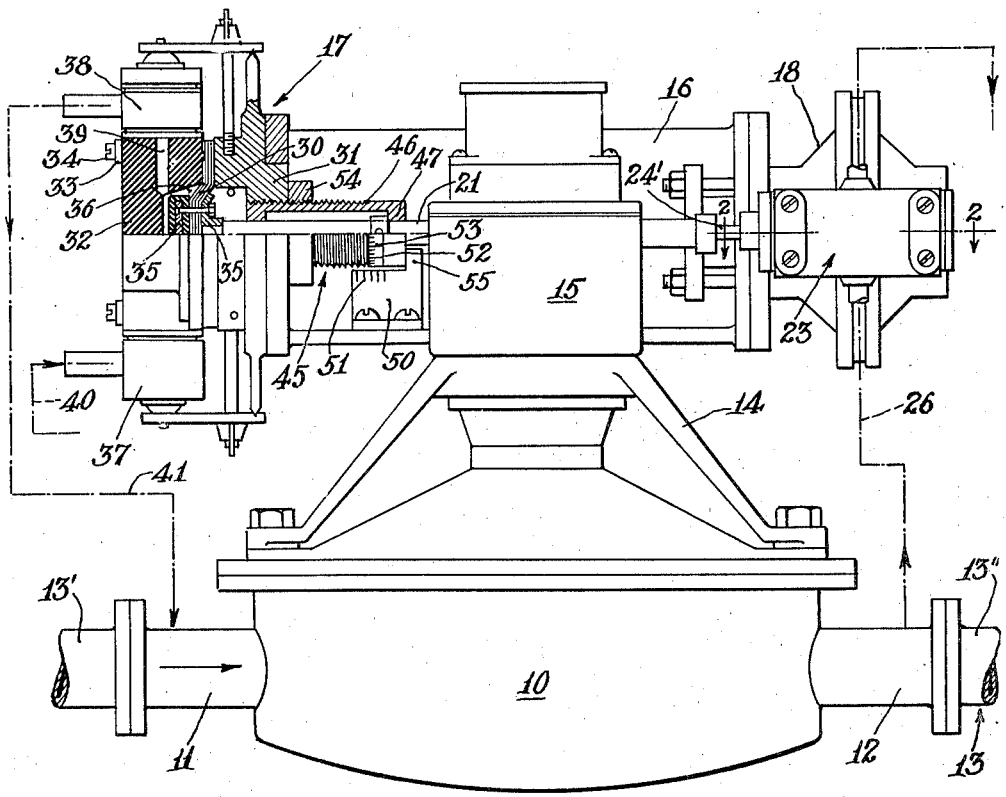
Figure 1 is a side elevational view, partially in section, showing a proportioning system embodying the features of our invention.

For purposes of disclosure, we have illustrated in the drawing and will hereinafter describe in detail the preferred embodiment of the invention, with the understanding that we do not intend to limit our invention to the particular construction and arrangement shown, it being contemplated that various changes may be made by those skilled in the art without departing from the spirit and scope of the appended claims.

In the form chosen for disclosure herein the invention is embodied in a proportioning apparatus adapted for use in proportionally injecting a reagent into a variable flow of liquid in a main conduit, said apparatus comprising a meter 10 having inlet and outlet connector pipes 11 and 12 adapted to be placed between pipe sections 13' and 13" of a main conduit 13.

Figure 2:
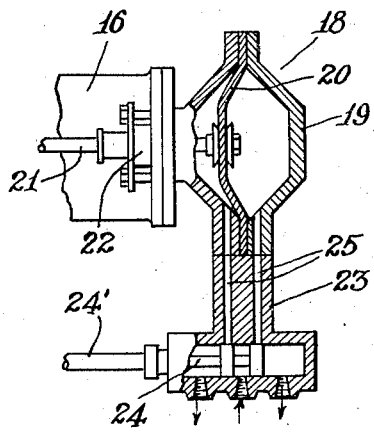
Figure 2 is a sectional view of a portion of the apparatus of Figure 1, the view being taken along the line 2—2 of Figure 1.

A mounting bracket 14 on the meter 10 serves to support a gear box 15 which in turn supports a mounting yoke 16 projecting in opposite directions from the gear box. The mounting yoke 16 carries an injection pump 17 at one end and an actuator 18 for the pump 17 at the other end. Both the actuator 18 and the pump 17 are preferably reciprocatory in character, and as herein shown, each is in the form of a flexible diaphragm device. Thus as shown in Figure 2, the actuator 18 has a separable housing 19 between the two sections of which the peripheral edge of a diaphragm 20 is clamped. Centrally of the diaphragm 20 one end of a piston or connecting rod 21 is secured, the rod 21 extending slidably from the housing 19 through a bearing gland 22.

A control valve device 23 is mounted on the actuator housing 19, and as the slidable valve member 24 is reciprocated, pressure fluid is supplied first to one side of the diaphragm and then to the other through passages 25 from the valve housing. Pressure fluid is supplied from the main conduit through a suitable connection such as that indicated diagrammatically at 26 in Figure 1.

The valve member 24 is reciprocated by, and in proportional relation to, the operation of the meter 10 through suitable gearing, preferably replaceably housed within the gear box 15 and operatively connected to the valve rod 24'.

The injection pump 17 has a flexible rubber treated diaphragm 30, the peripheral edge of which is clamped between a mounting member 31 and a body member 32, these members being secured together by clamp plates 33 and bolts 34. The mounting member 31 is so mounted on the yoke 16 that the diaphragm 30 is normally perpendicular to the connecting rod 21, and the central portion of the diaphragm 30 is connected to the end of the rod 21 by clamp plates 35, one of the plates 35 being secured as by riveting to the rod 21.

When the diaphragm 30 is flexed by actuation of the rod 21, it moves into or out of a pump chamber 36 formed in the adjacent face of the body member 32.

Intake and exhaust check valves 37 and 38 are mounted on the upper and lower ends of the body member 32 and communicate with the pump chamber 36 through similar passages 39 formed in the body member 32. The intake valve 37 is connected to a reagent source by a suitable conduit indicated at 40, while the discharge check valve 38 is connected by a pipe or hose 41 to the conduit section 13' or pipe 11.

For any particular ratio of gearing in the gear box 15, the pump 17 is stroked at a rate which bears a definite and fixed proportion to the rate of flow in the conduit 13. The variation in reagent dosage or proportion is, therefore, attained in most cases through adjustment of the pump stroke; and in accordance with the present invention such adjustment is effected by an adjustable micrometer stop mechanism 45 acting to limit the suction stroke of the pump 17.

In the form shown, the adjustable stop mechanism 45 comprises a sleeve 46 surrounding the connecting rod 21 adjacent to the pump 17 and threaded into the mounting member 31. In this position an inturned flange 47 at its outer end (right hand, in Figure 1) lies in the path of a collar 48 fixed on the actuating rod 21 within the sleeve 46. The embodiment herein shown provides for a maximum pump stroke of one-half inch, the pump of this size and construction being accurate throughout such a range, and a scale 50 fixed on the yoke 16 has a five one-tenth inch scale divisions 51 marked thereon. An annular line 52 on the sleeve 46 indicates, by its relation to the divisions 51, the adjustment of the sleeve 46. To attain further accuracy, the screw threads of the sleeve 46 have a one-tenth inch lead, so that one full rotation of the sleeve 46 changes the pump stroke exactly one-tenth of an inch. By providing ten equal graduations 53 along the annular line 52, a micrometer adjustment is provided for the stroke to an accuracy of one-hundredth of an inch. A lock nut 54 threaded on the outer surface of the sleeve 46 may be tightened against the mounting member 31 to maintain the required adjustment.

As herein shown, the scale 50 has an integral stop 55 lying in the path of the outer end of the sleeve 46 so as to prevent undue withdrawal of the sleeve. Thus over-stroking of the diaphragm 30 is prevented, and it should be noted that by such limitation, accuracy of feeding is insured and undue strain and wear on the diaphragm is avoided.

This application is a division of our copending application Serial No. 25,467, filed June 7, 1935, patented January 31, 1939, #2,145,566.

We claim as our invention:

1. A proportioning device having in combination, a reciprocatory pump, means for reciprocating said pump arranged to move said pump through its suction stroke with a yieldingly applied force, adjustable stop means acting to limit and vary the suction stroke of the pump, a screw threaded member for adjusting said stop means, said member having threads of one-tenth inch pitch, and said member having ten equal divisions about its circumference, and means providing an indicator showing the position of the stop means to an accuracy of one-tenth inch, and means cooperating with said divisions to show the position of the stop means to an accuracy of one-hundredth of an inch.

2. In a device of the character described, the combination of a reciprocable diaphragm pump, actuating means operable to reciprocate said diaphragm, the suction stroke actuation thereof being by a yieldingly applied force, adjustable stop means for variably limiting such suction stroke movement, a screw threaded member operable in each full rotation to move said stop means through one-tenth of an inch, a scale parallel to said member marked with one-tenth inch graduations, an annular indicating line on said member cooperating with said scale to indicate the position of adjustment, an annularly arranged series of ten equally spaced division marks on said member, and a stationary indicating element cooperating with said division marks to provide a micrometer indication of the position of said stop means.

3. In a device of the character described, the combination of a reciprocable diaphragm pump, actuating means operable to reciprocate said diaphragm, the suction stroke actuation thereof being by a yieldingly applied force, adjustable stop means for variably limiting such suction stroke movement, a screw threaded member operable in each full rotation to move said stop means through one-tenth of an inch, a scale parallel to said member marked with one-tenth inch graduations, an annular indicating line on said member cooperating with said scale to indicate the position of adjustment, an annularly arranged series of ten equally spaced division marks on said member, and a stationary indicating element cooperating with said division marks to provide a micrometer indication of the position of said stop means, said stationary indicating element having a part operable to determine the maximum movement of said diaphragm.

JEFF CORYDON.
RUDY LOWE.